United States Patent
Watson et al.

(10) Patent No.: US 11,151,410 B2
(45) Date of Patent: Oct. 19, 2021

(54) GENERATING AND AUGMENTING TRANSFER LEARNING DATASETS WITH PSEUDO-LABELED IMAGES

(71) Applicant: International Business Machines Corporation, Armonk, NY (US)

(72) Inventors: Patrick Watson, Montrose, NY (US); Bishwaranjan Bhattacharjee, Yorktown Heights, NY (US); Siyu Huo, Yorktown Heights, NY (US); Noel C. Codella, White Plains, NY (US); Brian M. Belgodere, Fairfield, CT (US); Parijat Dube, Yorktown Heights, NY (US); Michael R. Glass, Bayonne, NJ (US); John R. Kender, Leonia, NY (US); Matthew L. Hill, Yonkers, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 114 days.

(21) Appl. No.: 16/125,153

(22) Filed: Sep. 7, 2018

(65) Prior Publication Data

US 2020/0082210 A1 Mar. 12, 2020

(51) Int. Cl.
G06K 9/62 (2006.01)
G06F 16/51 (2019.01)

(52) U.S. Cl.
CPC .......... G06K 9/6215 (2013.01); G06F 16/51 (2019.01); G06K 9/6259 (2013.01)

(58) Field of Classification Search
CPC .... G06K 9/6215; G06K 9/6259; G06F 16/51; G06N 20/00

USPC .............................................. 382/159; 706/12
See application file for complete search history.

(56) References Cited

U.S. PATENT DOCUMENTS

| | | | |
|---|---|---|---|
| 9,053,391 B2 | 6/2015 | Wang et al. | |
| 9,875,736 B2* | 1/2018 | Kim | G06N 7/005 |
| 2009/0132561 A1 | 5/2009 | Cormode et al. | |
| 2015/0254555 A1 | 9/2015 | Williams, Jr. et al. | |
| 2015/0379422 A1 | 12/2015 | Chandler | |
| 2016/0253597 A1* | 9/2016 | Bhatt | G06N 20/00 706/12 |
| 2017/0154282 A1* | 6/2017 | Rossi | G06K 9/00496 |

(Continued)

OTHER PUBLICATIONS

Wigness et al., "Efficient label collection for unlabeled image datasets," 2015 IEEE Conference on Computer Vision and Pattern Recognition (CVPR), Boston, MA, 2015, pp. 4594-4602, doi: 10.1109/CVPR.2015.7299090.

(Continued)

*Primary Examiner* — Yuwen Pan
*Assistant Examiner* — Umair Ahsan
(74) *Attorney, Agent, or Firm* — Cantor Colburn LLP; Anthony Curro

(57) ABSTRACT

A computer-implemented method for data labeling is provided. The computer-implemented method assigns pseudo-labels to unlabeled examples of data using a similarity metric on an embedding space to produce pseudo-labeled examples. A curriculum learning model is trained using the pseudo-labeled examples. The curriculum learning model trained with the pseudo-labeled examples is employed in in a fine-tuning task to enhance classification accuracy of the data.

17 Claims, 6 Drawing Sheets

(56) References Cited

U.S. PATENT DOCUMENTS

2018/0253529 A1 9/2018 Zhao et al.
2018/0308003 A1* 10/2018 Singh .................... G06N 5/003
2019/0258901 A1 8/2019 Albright et al.

OTHER PUBLICATIONS

Ben-David, et al., "A notion of task relatedness yielding provable multiple-task learning guarantees," Mach Learn (2008) 73:273-287; DOI 10.1007/s10994-007-5043-5: 15 pages.
Ge, et al., "Borrowing Treasures from theWealthy: Deep Transfer Learning through Selective Joint Fine-Tuning," arXiv:1702.08690v2 [cs.0CV] Jun. 6, 2017; 10 pages.
Mahajan, et al., "Exploring the Limits of Weakly Supervised Pretraining," (2017 Facebook Study); 23 pages.
Van Der Maaten, et al., "Advancing state-of-the-art image recognition with deep learning on hashtags," retrieved Jul. 10, 2018; 2 pages.
Zamier, et al., "Taskonomy: Disentangling Task Transfer Learning," http://taskonomy..vision/; CVPR2018(1): 12 pages.

* cited by examiner

GENERATING AND AUGMENTING TRANSFER LEARNING DATASETS WITH PSEUDO-LABELED IMAGES

BACKGROUND

The disclosure relates generally to transfer learning, and more specifically, to generating and augmenting transfer learning datasets with pseudo-labeled images.

In general, conventional data labeling is a manual process where users identify and tag unlabeled elements of a data set. For example, a data set may contain over eight million images. Conventionally, a user individually reviews, identifies and tags each image with a label to create a labeled data set. In some cases, the user can automate the identification and tagging by using a labeling model. Yet, the labeling model must be created and trained using labeled data. Unfortunately, too often, users do not have enough labeled data of the data set to pre-train models, let alone create models.

SUMMARY

According to one or more embodiments of the invention, a computer-implemented method for data labeling is provided. The computer-implemented method assigns pseudo-labels to unlabeled examples of data using a similarity metric on an embedding space to produce pseudo-labeled examples. A curriculum learning model is trained using the pseudo-labeled examples. The curriculum learning model trained with the pseudo-labeled examples is employed in a fine-tuning task to enhance classification accuracy of the data.

According to embodiments of the invention, the computer-implemented method described herein can be implemented as a system and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
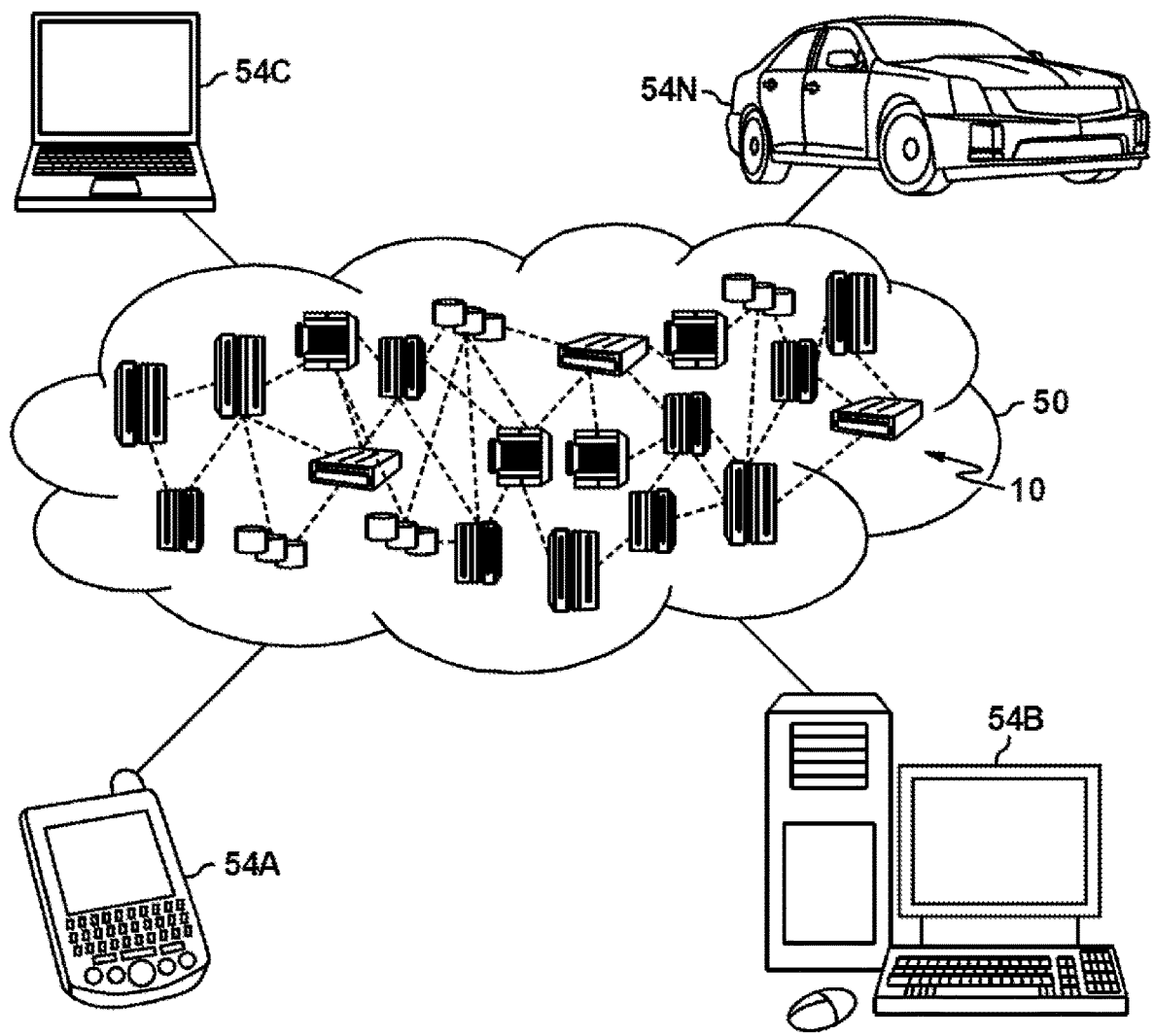
FIG. 1 depicts a cloud computing environment in accordance with one or more embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, an example of conventional data labeling includes a manual process where a data list is provided to a user (e.g., such as a data list of cats, dogs, and trees; a data list of category 1 and category 2; etc.). The user then compares and matches the data list with a subset of elements of a data set (e.g., a subset of a million images from over eight million images). In this regard, the user determines which label of the data list best matches or is most similar to each element in the subset (e.g., manually determine which picture is of a cat, dog, or tree). These elements, once manually compared and matched, are considered labeled data elements that are used to pre-train a labeling model. Once the labeling model is pre-trained, the labeling model can be applied to remaining elements of the data set (e.g., the remaining seven million images from over eight million images) to identify which label of the data list best matches or is most similar to each element on the remaining elements and it accordingly.

In the above examples, the conventional data labeling has the inherent shortcoming that users do not have enough data to pre-train models or enough optimal data to create models. Further, the manual process is significantly hindered by the sheer volume of data requiring labeling (which is only increases over time), while also being is insufficient or unable to handle non-observable data sets (e.g., some data sets are in domains that are not human observable, such as time series data).

Turning now to an overview of the aspects of the invention, one or more embodiments of the invention address the herein-described shortcomings of the conventional data labeling by executing generating and augmenting transfer learning datasets with pseudo-labeled data elements to achieve perfect data labeling. In this regard, aspects of the invention provide a technique for assigning automatically generated pseudo-labels to unlabeled data elements for use in creating transfer models to enhance performance on a target task (e.g., correctly labeling over eight million images). A pseudo-label is a listing of a similarities of data elements to different data elements (e.g., a relative label or relative name). Pseudo-label are automatically generated based on a distancing metric applied to unlabeled data elements of the data set to determine a distance, which itself is used as a pseudo-label of these unlabeled data items. Pseudo-labels are not human interpretable, as they can appear as arbitrary alphanumeric codes. More particularly, the pseudo-labels are data type agnostics, as any vector representation will work.

Embodiments of the invention disclosed herein may include system, method, and/or computer program product (herein a system architecture) that executing generating and augmenting transfer learning datasets with pseudo-labeled images to achieve the perfect data labeling.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
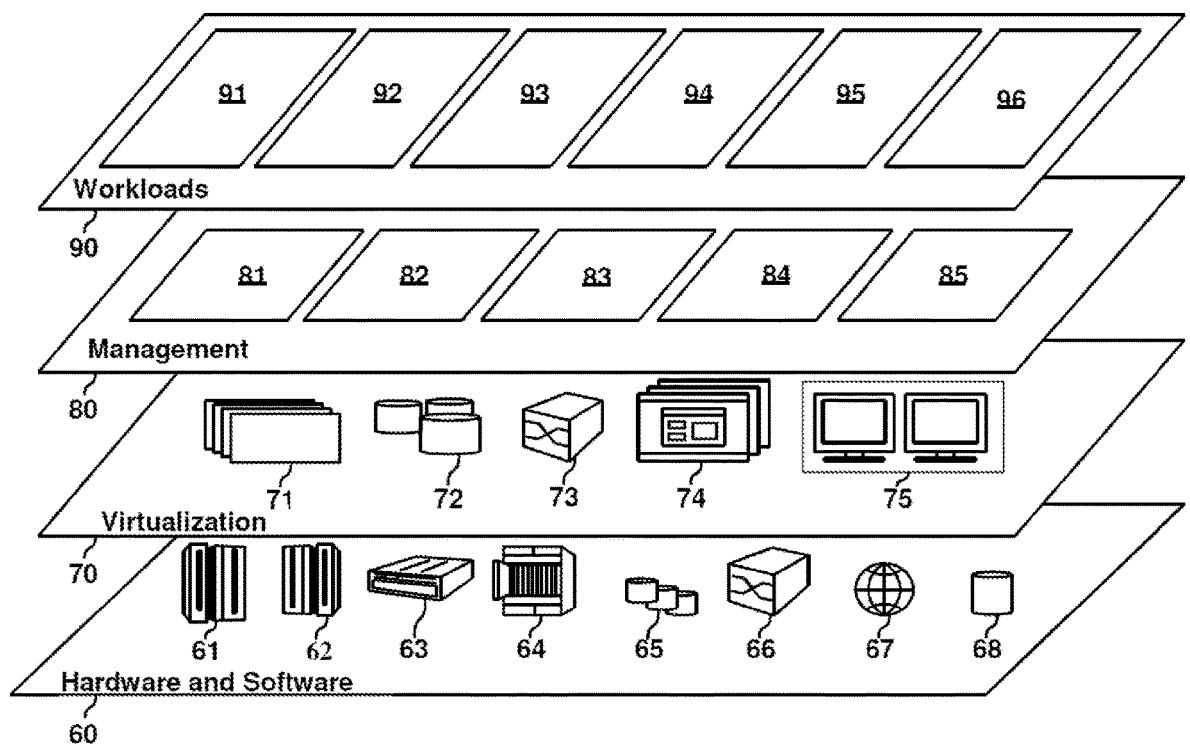
FIG. 2 depicts abstraction model layers in accordance with one or more embodiments of the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module for executing generating and augmenting transfer learning datasets with pseudo-labeled images 96.

Figure 3:
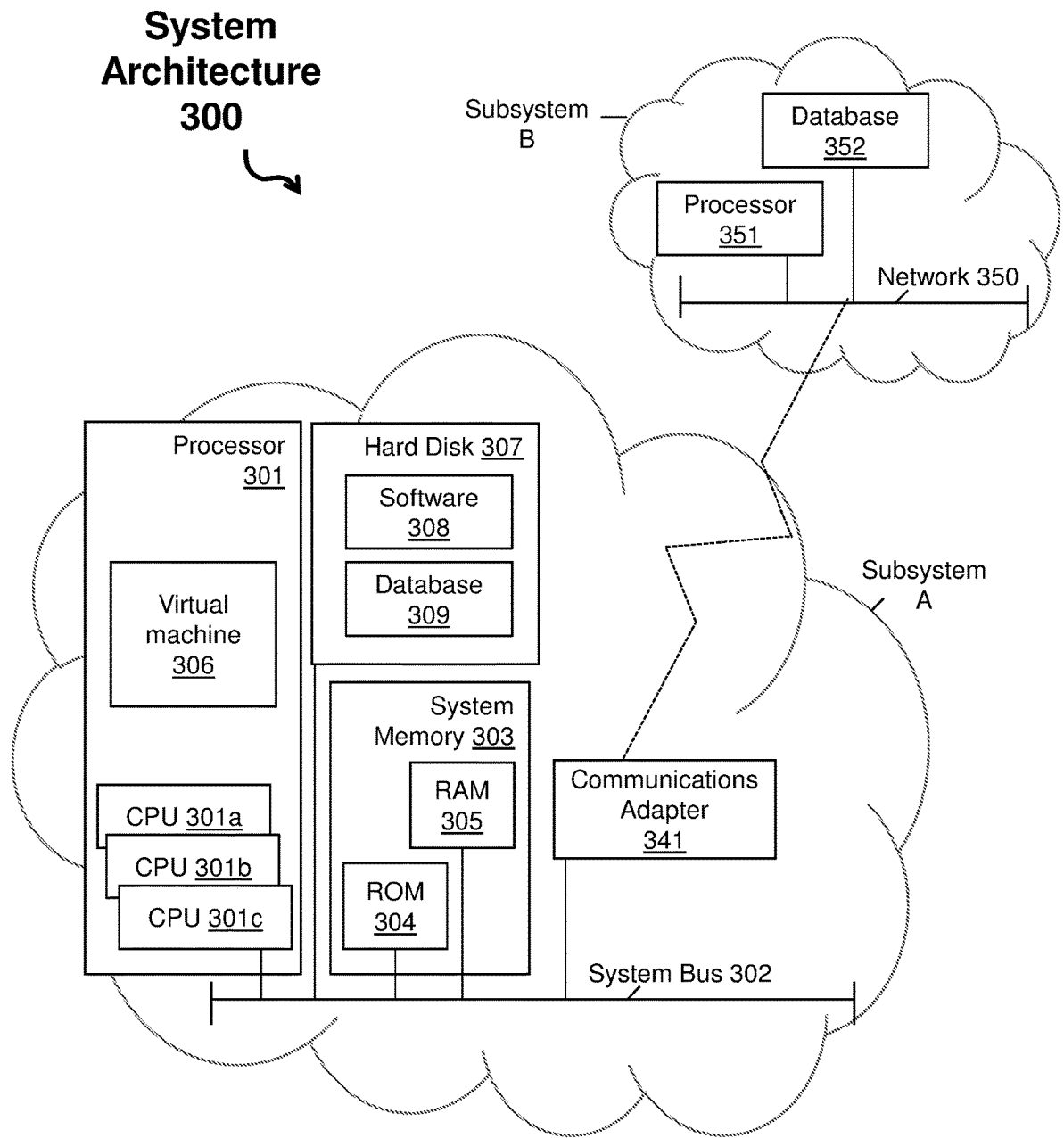
FIG. 3 depicts an system architecture in accordance with one or more embodiments.

Turning now to FIG. 3, a system architecture 300 for implementing the teachings herein is shown in according to one or more embodiments of the invention. In this embodiment, the system architecture 300, which can be a distributed computing system as described herein, comprises at least Subsystem A and Subsystem B. Subsystem A has a processor 301, which can include one or more central processing units (CPUs) 301a, 301b, 301c, etc. The processor 301, also referred to as a processing circuit, microprocessor, computing unit, is coupled via a system bus 302 to a system memory 303 and various other components. The system memory 303 includes read only memory (ROM) 304 and random access memory (RAM) 305. The ROM 304 is coupled to the system bus 302 and may include a basic input/output system (BIOS), which controls certain basic functions of the system architecture 300. The RAM is read-write memory coupled to the system bus 302 for use by the processor 301. The processor 301 and the system memory 303 together can execute a virtual machine 306, which support the assigning pseudo-labels as discussed herein. Note that the virtual machine 306 is an example of an emulation of a computer system that provides a functionality of a physical computer.

The Subsystem A of FIG. 3 also includes a hard disk 307, which is an example of a tangible storage medium readable executable by the processor 301. The hard disk 307 stores software 308 and database 309. The software 308 is stored as instructions for execution on the system architecture 300 by the processor 301 (to perform process, such as the process flows of FIGS. 4-6, e.g., generating and augmenting transfer learning datasets with pseudo-labeled images). The database 309 includes a set of values of qualitative or quantitative variables organized in various data structures to support and be use by operations of the software 308. For example, the database 309 can store user data sets comprising labeled, unlabeled, and task-specific data and can store pre-trained, newly created, transfer, and labeling models.

The system architecture 300 of FIG. 3 includes one or more adapters (e.g., hard disk controllers, network adapters, graphics adapters, etc.) that interconnect and support communications between the processor 301, the system memory 303, the hard disk 307, and other components of the system architecture 300 (e.g., peripheral and external devices). In one or more embodiments of the present invention, the one or more adapters can be connected to one or more I/O buses that are connected to the system bus 302 via an intermediate bus bridge, and the one or more I/O buses can utilize common protocols, such as the Peripheral Component Interconnect (PCI).

As shown, the system architecture 300 includes a communications adapter 341 interconnects the system bus 302 with a network 350 of Subsystem B enabling the system architecture 300 to communicate with other systems, devices, data, and software, such as a processor 351 and a database 351. In one or more embodiments of the present invention, the operations of the software 308 and the data 309 can be implemented on the network 350 by the processor 351 and the database 351. For instance, the network 350, the processor 351, and the database 351 can combine to provide internal iterations of the software 308 and the database 309 as a platform as a service, a software as a service, and/or infrastructure as a service (e.g., as a web application in a distributed system).

Thus, as configured in FIG. 3, the operations of the software 308 and the data 309 (e.g., the system architecture 300) are necessarily rooted in the computational ability of the processor 301 and/or the processor 351 to overcome and address the herein-described shortcomings of the conventional data labeling. In this regard, the software 308 and the database 309 improve computational operations of the processor 301 and/or the processor 351 of the system architecture 300 by reducing errors in labeling that cause additional processing cycles (thereby increasing efficiency of the system architecture 300).

Figure 4:
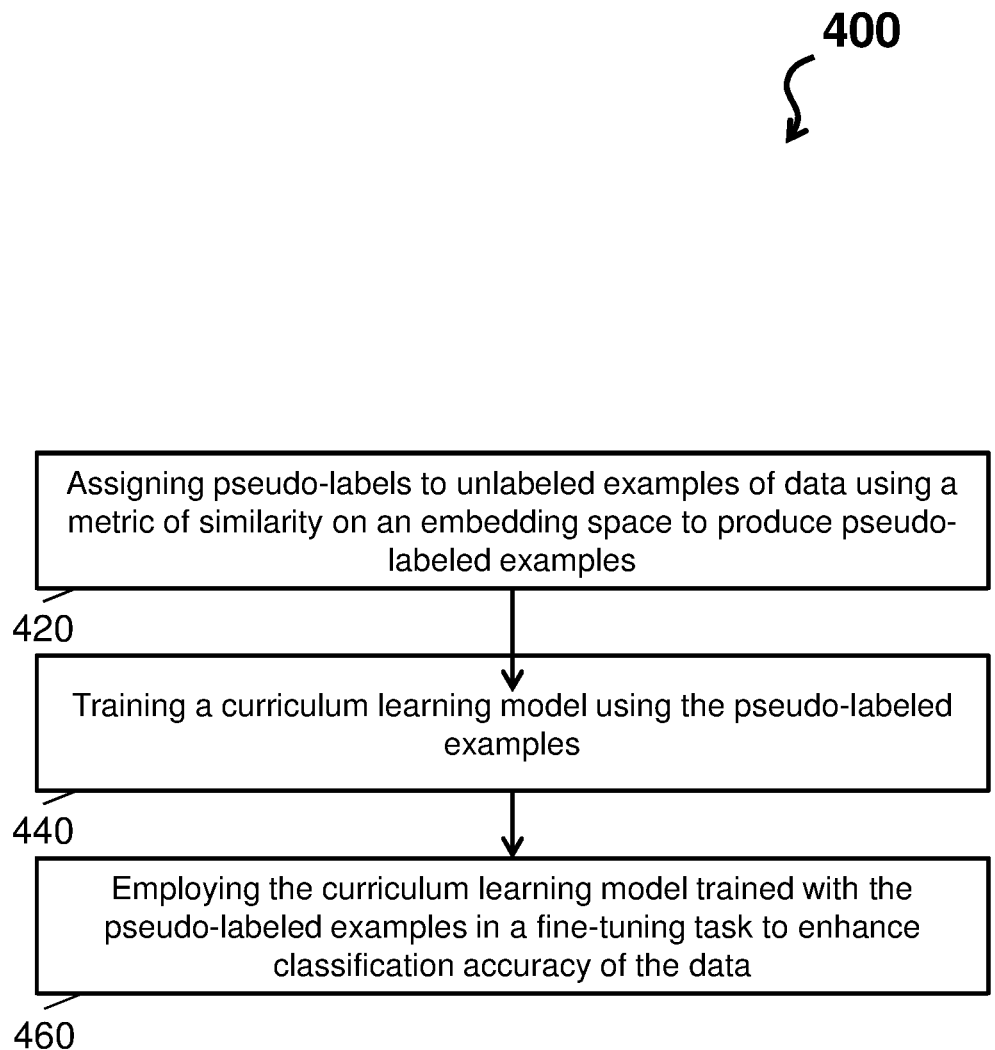
FIG. 4 depicts a process flow in accordance with one or more embodiments of the invention.

FIG. 4 depicts a process flow 400 in accordance with one or more embodiments of the invention. The process flow 400 can be implemented by any computing system, such as the system architecture 300 of FIG. 3.

The process flow 400 begins at block 420, where the processor 301 coupled to the system memory 303 assigns pseudo-labels to unlabeled examples of data (e.g., in the database 309) using a similarity metric on an embedding space to produce pseudo-labeled examples. At block 440, the processor 301trains a curriculum learning model (e.g., executed by the virtual machine 306) using the pseudo-labeled examples. At block 460, the curriculum learning model trained with the pseudo-labeled examples is employed (e.g., by the virtual machine 306) in a fine-tuning task to enhance classification accuracy of the data.

Figure 5:
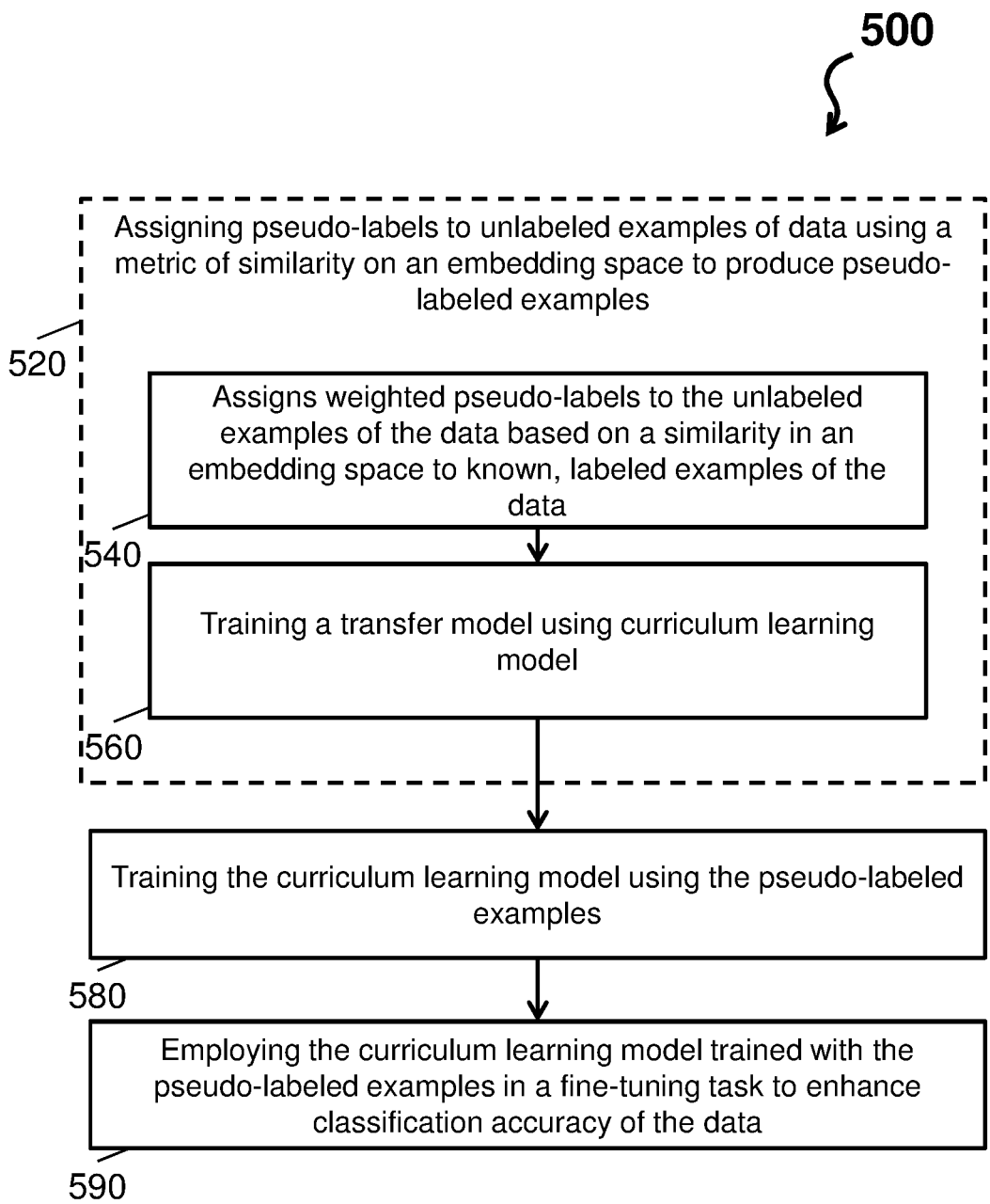
FIG. 5 depicts a process flow in accordance with one or more embodiments of the invention.

FIG. 5 depicts a process flow 500 in accordance with one or more embodiments of the invention. The process flow 500 can be implemented by any computing system, such as the system architecture 300 of FIG. 3.

The process flow 500 begins at block 520, where the processor 301 coupled to the system memory 303 assigns pseudo-labels to unlabeled examples of data (e.g., in the database 309) using a similarity metric on an embedding space to produce pseudo-labeled examples. Block 520 is further described by sub-block 540 and 560. At sub-block 540, the processor 301 assigns weighted pseudo-labels (e.g., as an example of the pseudo-labels of block 520) to the unlabeled examples of the data based on a similarity metric in an embedding space to known, labeled examples of the data. At sub-block 560, the processor 301 trains a transfer model using a curriculum learning model. The transfer model can trained in order of pseudo-labeled examples, labeled examples, and task-specific examples of the data.

Figure 6:
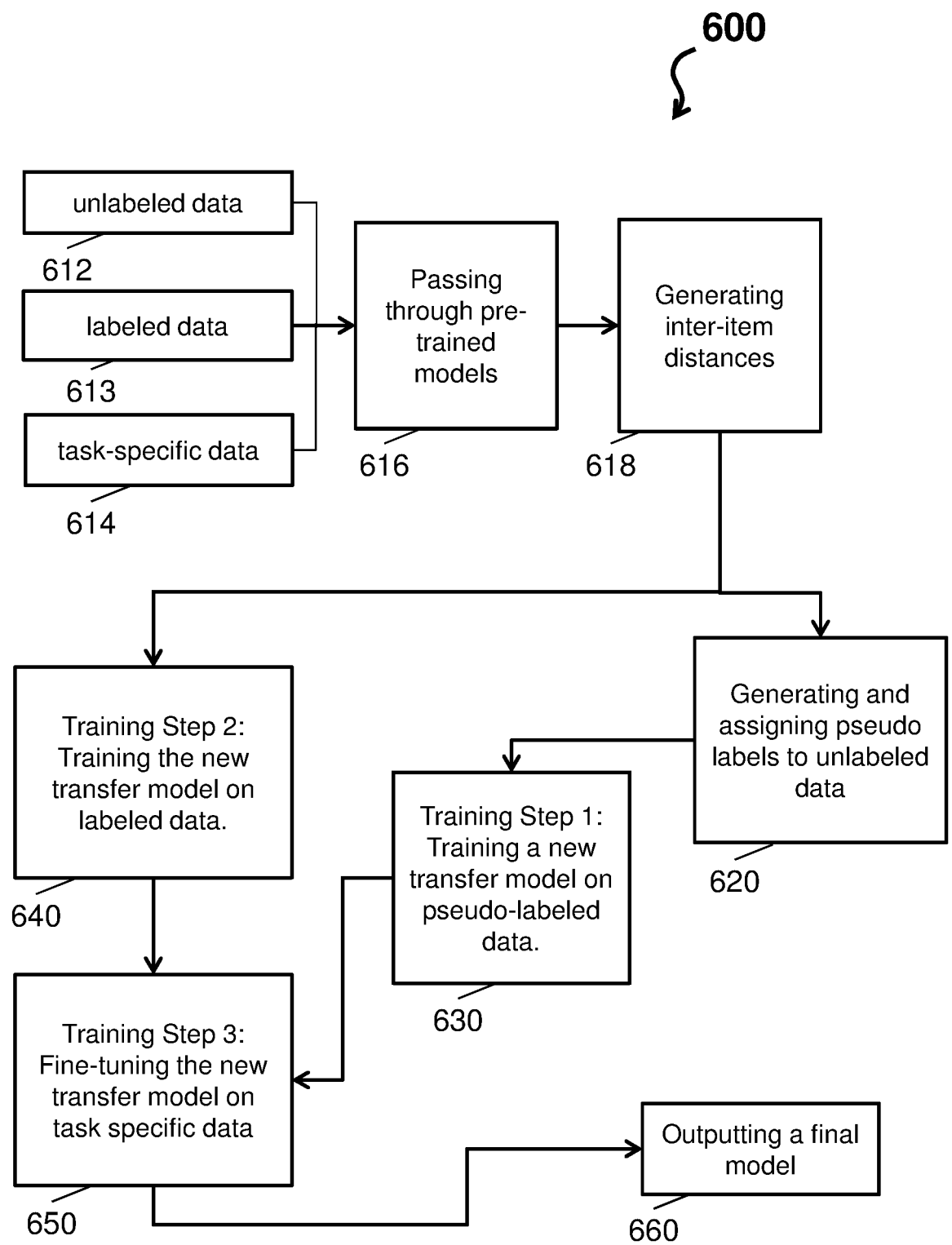
FIG. 6 depicts a process flow in accordance with one or more embodiments of the invention.

At block 580, the processor 301 trains a curriculum learning model (e.g., executed by the virtual machine 306) using the pseudo-labeled examples. At block 490, the curriculum learning model trained with the pseudo-labeled examples is employed (e.g., by the virtual machine 306) in a fine-tuning task to enhance classification accuracy of the data FIG. 6 depicts a process flow 600 in accordance with one or more embodiments of the invention. The process flow 600 can be implemented by any computing system, such as the system architecture 300 of FIG. 3.

The process flow 600 begins at blocks 612, 613, and 614, where a user data set is obtained. The user data set comprises unlabeled data (at block 612), labeled data (at block 613), and task-specific data (at block 614). Proportionally, the unlabeled data of block 612 is greater in volume than the labeled data of block 613, which is greater in volume than the task-specific data of block 614.

At block 616, the user data set is passed through pre-trained models (for forward prediction). Forward prediction comprises an image feature extraction where the pre-trained model penultimate layer's outputs are feature vectors, from which each category's average feature vectors is computed as a category feature representation. Note that the category feature representation for both source and target data sets are computed. This is repeated for other target layers.

At block 618, inter-item distances are generated. Inter-item distances are generated for each unlabeled element utilizing each pre-trained model. In this regard, each pre-trained model generates an individual dissimilarity score (e.g., dissimilarity scores between source and target dataset to measure how they different from each other, such as 0 for similar and 1 for dissimilar) for each unlabeled element. Note that the pre-trained model can be utilized in accordance with a hierarchical agglomerative clustering.

In accordance with one or more embodiments, a dissimilarity measures as the inter-item distances are computed according to equation 1.

$$D_{KL}(P \| Q) = \sum_i P(i) \log \frac{P(i)}{Q(i)}.$$

Equation 1

KL is a divergence between a target P and a source Q, Q represents a theory, model, description, or approximation of P. For instance, $D_{KL}$(target∥source) are computed as dissimilarity scores between source and target dataset to measure how they different from each other (e.g., 0: similar, 1: dissimilar).

At block 620, pseudo labels generated and assigned to unlabeled data. For instance, the individual dissimilarity scores are placed in a new vector (formed to hold a plurality of dissimilarity scores for each unlabeled element). The combined new vector and scores therein is the pseudo label for the unlabeled element.

In accordance with one or more embodiments, a category dictionary c that contains (1, M), where 1 is the high-level category label and M is a vector in embedding space pointing to the center of the cluster, is created. For an unknown image i, find KLD (as in 1) of the image to each i, and store this as weight w to create a dictionary of pseudo labeled images I→(i, w). Note that pseudo-labels don't have to be nameable, as they are standing in for category-clusters.

At blocks 630, 640, and 650, training steps 1, 2, and 3, are performed. At block 630, a new transfer model trained on pseudo-labeled data. At block 630, the new transfer model is also trained on the labeled data of block 613. At block 650, the new transfer model is fine-tuned on the task specific data of block 614.

At block 630, a final model is outputted. Note that a performance of the final model (such as sorting images or responding to un-seen data samples) has demonstrated greater accuracy on a small data task after augmentation with pseudo labels.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data labeling, the computer-implemented method comprising:
   receiving a data set comprising unlabeled data, labeled data, and task-specific data, wherein a volume of the unlabeled data is greater than a volume of the labeled data, and wherein the volume of the labeled data is greater than a volume of the task-specific data;
   passing the data set through a pre-trained model for forward prediction, wherein forward prediction comprises an image feature extraction whereby the pre-trained model penultimate layer outputs are feature vectors from which average feature vectors are computed as a category feature representation;
   determining, based on the pre-trained model, inter-item distances for each unlabeled element of the unlabeled data;
   assigning, by a processor coupled to a memory, pseudo-labels to unlabeled examples of data using a similarity metric on an embedding space based on the inter-item distances to produce pseudo-labeled examples;

training, by the processor, a transfer model using the pseudo-labeled examples;

fine-tuning the transfer model trained using the pseudo-labeled examples by training on the labeled data; and fine-tuning the transfer model trained using the labeled data by training on the task specific data to enhance classification accuracy of the data.

2. The computer-implemented method of claim 1, wherein the pseudo-labels comprise weighted pseudo-labels.

3. The computer-implemented method of claim 2, wherein assigning the pseudo-labels comprises assigning the weighted pseudo-labels to the unlabeled examples of the data based on the similarity metric in an embedding space to known, labeled examples of the data.

4. The computer-implemented method of claim 1, wherein assigning the pseudo-labels comprises training the transfer model using a curriculum learning model.

5. The computer-implemented method of claim 1, wherein the pseudo labels comprise a vector holding a plurality of dissimilarity scores for each unlabeled example.

6. The computer-implemented method of claim 5, wherein one or more pre-trained models generate the plurality of individual dissimilarity scores.

7. A computer program product comprising a non-transitory computer readable storage medium having program instructions for data labeling, the program instructions executable by a processor coupled to a memory to cause:

receiving, by the processor, a data set comprising unlabeled data, labeled data, and task-specific data, wherein a volume of the unlabeled data is greater than a volume of the labeled data, and wherein the volume of the labeled data is greater than a volume of the task-specific data;

passing the data set through a pre-trained model for forward prediction, wherein forward prediction comprises an image feature extraction whereby the pre-trained model penultimate layer outputs are feature vectors from which average feature vectors are computed as a category feature representation;

determining, based on the pre-trained model, inter-item distances for each unlabeled element of the unlabeled data;

assigning, by the processor, pseudo-labels to unlabeled examples of data using a similarity metric on an embedding space based on the inter-item distances to produce pseudo-labeled examples;

training, by the processor, a transfer model using the pseudo-labeled examples;

fine-tuning the transfer model trained using the pseudo-labeled examples by training on the labeled data; and fine-tuning the transfer model trained using the labeled data by training on the task specific data to enhance classification accuracy of the data.

8. The computer program product of claim 7, wherein the pseudo-labels comprise weighted pseudo-labels.

9. The computer program product of claim 8, wherein assigning the pseudo-labels comprises assigning the weighted pseudo-labels to the unlabeled examples of the data based on the similarity metric in an embedding space to known, labeled examples of the data.

10. The computer program product of claim 7, wherein assigning the pseudo-labels comprises training the transfer model using a curriculum learning model.

11. The computer program product of claim 7, wherein the pseudo labels comprise a vector holding a plurality of dissimilarity scores for each unlabeled example.

12. The computer program product of claim 11, wherein one or more pre-trained models generate the plurality of individual dissimilarity scores.

13. A system architecture comprising a processor and a memory storing program instructions for data labeling, the program instructions executable by the processor to cause:

receiving, by the processor, a data set comprising unlabeled data, labeled data, and task-specific data, wherein a volume of the unlabeled data is greater than a volume of the labeled data, and wherein the volume of the labeled data is greater than a volume of the task-specific data;

passing the data set through a pre-trained model for forward prediction, wherein forward prediction comprises an image feature extraction whereby the pre-trained model penultimate layer outputs are feature vectors from which average feature vectors are computed as a category feature representation;

determining, based on the pre-trained model, inter-item distances for each unlabeled element of the unlabeled data;

assigning, by the processor, pseudo-labels to unlabeled examples of data using a similarity metric on an embedding space based on the inter-item distances to produce pseudo-labeled examples;

training, by the processor, a transfer model using the pseudo-labeled examples;

fine-tuning the transfer model trained using the pseudo-labeled examples by training on the labeled data; and fine-tuning the transfer model trained using the labeled data by training on the task specific data to enhance classification accuracy of the data.

14. The system architecture of claim 13, wherein the pseudo-labels comprise weighted pseudo-labels.

15. The system architecture of claim 14 wherein assigning the pseudo-labels comprises assigning the weighted pseudo-labels to the unlabeled examples of the data based on the similarity metric in an embedding space to known, labeled examples of the data.

16. The system architecture of claim 13, wherein assigning the pseudo-labels comprises training the transfer model using a curriculum learning model.

17. The system architecture of claim 13, wherein the pseudo labels comprise a vector holding a plurality of dissimilarity scores for each unlabeled example.

\* \* \* \* \*